(12) United States Patent
Berthold et al.

(10) Patent No.: US 7,684,051 B2
(45) Date of Patent: Mar. 23, 2010

(54) FIBER OPTIC SEISMIC SENSOR BASED ON MEMS CANTILEVER

(75) Inventors: John W. Berthold, Salem, OH (US); David B. Needham, Magnolia, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 391 days.

(21) Appl. No.: 11/787,965

(22) Filed: Apr. 18, 2007

(65) Prior Publication Data

US 2008/0174781 A1 Jul. 24, 2008

Related U.S. Application Data

(60) Provisional application No. 60/792,878, filed on Apr. 18, 2006.

(51) Int. Cl.
*G01B 9/02* (2006.01)
(52) U.S. Cl. ...................................................... 356/519
(58) Field of Classification Search ................ 356/480, 356/498, 501, 505, 506, 519
See application file for complete search history.

(56) References Cited

U.S. PATENT DOCUMENTS

| | | |
|---|---|---|
| 1,432,149 A | 10/1922 | Bellingham |
| 3,923,400 A | 12/1975 | Hardy |
| 4,210,029 A | 7/1980 | Porter |
| 4,329,058 A | 5/1982 | James et al. |
| 4,393,714 A | 7/1983 | Schmidt |
| 4,418,981 A | 12/1983 | Stowe |
| 4,428,239 A | 1/1984 | Johnston |
| 4,572,669 A | 2/1986 | James et al. |
| 4,576,479 A | 3/1986 | Downs |
| 4,583,228 A | 4/1986 | Brown et al. |
| 4,596,466 A | 6/1986 | Ulrich |
| 4,606,638 A | 8/1986 | Sommargren |
| 4,628,211 A | 12/1986 | Ruppert |
| 4,640,616 A | 2/1987 | Michalik |

(Continued)

FOREIGN PATENT DOCUMENTS

DE           3127333           1/1983

(Continued)

OTHER PUBLICATIONS

R. L. Johnson, et al. "Miniature Instrument for the Measurement of Gap Thickness Using Plychromatic Interferometry", Center for Astronomical Adaptive Optics, Steward Obser., U of AZ, Tucson.

(Continued)

*Primary Examiner*—Tarifur Chowdhury
*Assistant Examiner*—Jonathon D Cook
(74) *Attorney, Agent, or Firm*—Peter Schroeder

(57) ABSTRACT

A dual cantilevered beam structure is attached to a silicon frame. An optical fiber extends from a borosilicate wafer bonded to the bottom of the frame. A second borosilicate wafer is bonded to the top of the frame. The bottom borosilicate wafer is bonded to the optical fiber with a bonding agent having an index of refraction between the refractive index of the fused silica optical fiber and the refractive index of the borosilicate wafer. In an embodiment, the bonding agent has a refractive index substantially similar to optical cement. Light is reflected into the optical fiber from the beam structure for measuring seismic changes.

20 Claims, 9 Drawing Sheets

U.S. PATENT DOCUMENTS

| | | | |
|---|---|---|---|
| 4,647,203 A | 3/1987 | Jones et al. |
| 4,648,083 A | 3/1987 | Giallorenzi |
| 4,668,889 A | 5/1987 | Adams |
| 4,678,909 A | 7/1987 | Jackson et al. |
| 4,729,654 A | 3/1988 | Akuta et al. |
| 4,755,668 A | 7/1988 | Davis |
| 4,772,786 A | 9/1988 | Langdon |
| 4,777,358 A | 10/1988 | Nelson |
| 4,787,741 A | 11/1988 | Udd et al. |
| 4,806,016 A | 2/1989 | Corpron et al. |
| 4,844,616 A | 7/1989 | Kulkarni et al. |
| 4,873,989 A | 10/1989 | Einzig |
| 4,907,035 A | 3/1990 | Galburt et al. |
| 4,914,666 A | 4/1990 | Glance |
| 4,968,144 A | 11/1990 | Thomas et al. |
| 4,972,077 A | 11/1990 | Willson et al. |
| 4,995,697 A | 2/1991 | Adamovsky |
| 5,034,603 A | 7/1991 | Wilson |
| 5,089,696 A | 2/1992 | Turpin |
| 5,094,534 A | 3/1992 | Cole et al. |
| 5,119,024 A * | 6/1992 | Popovic et al. ............ 324/244.1 |
| 5,128,537 A | 7/1992 | Halg |
| 5,128,798 A | 7/1992 | Bowen et al. |
| 5,148,604 A | 9/1992 | Bantien |
| 5,177,805 A | 1/1993 | Groger et al. |
| 5,187,546 A | 2/1993 | Johnston |
| 5,202,939 A | 4/1993 | Belleville et al. |
| 5,202,969 A | 4/1993 | Sato |
| 5,218,418 A | 6/1993 | Layton |
| 5,218,426 A | 6/1993 | Hall et al. |
| 5,225,888 A | 7/1993 | Selwyn et al. |
| 5,239,400 A | 8/1993 | Liu |
| 5,247,597 A | 9/1993 | Blacha et al. |
| 5,276,501 A | 1/1994 | McClintock et al. |
| 5,283,625 A | 2/1994 | Bunn, Jr. |
| 5,319,981 A | 6/1994 | Mei et al. |
| 5,351,317 A | 9/1994 | Weber |
| 5,361,130 A | 11/1994 | Kersey et al. |
| 5,386,729 A | 2/1995 | Reed et al. |
| 5,392,117 A | 2/1995 | Belleville et al. |
| 5,400,140 A | 3/1995 | Johnston |
| 5,401,956 A | 3/1995 | Dunphy et al. |
| 5,401,958 A | 3/1995 | Berkcan |
| 5,420,688 A | 5/1995 | Farah |
| 5,444,724 A | 8/1995 | Goto |
| 5,451,772 A | 9/1995 | Narendran |
| 5,471,428 A | 11/1995 | Baroni et al. |
| 5,477,323 A | 12/1995 | Andrews et al. |
| 5,497,233 A | 3/1996 | Meyer |
| 5,509,023 A | 4/1996 | Glance et al. |
| 5,526,114 A | 6/1996 | Eselun |
| 5,550,373 A | 8/1996 | Cole et al. |
| 5,557,406 A | 9/1996 | Taylor et al. |
| 5,559,358 A | 9/1996 | Burns et al. |
| 5,631,736 A | 5/1997 | Thiel et al. |
| 5,641,956 A | 6/1997 | Vengsarkar et al. |
| 5,646,762 A | 7/1997 | Delavaux et al. |
| 5,647,030 A | 7/1997 | Jorgenson et al. |
| 5,657,405 A | 8/1997 | Fujiwara |
| 5,682,237 A | 10/1997 | Belk |
| 5,739,945 A * | 4/1998 | Tayebati ..................... 359/291 |
| 5,760,391 A | 6/1998 | Narendran |
| 5,784,507 A | 7/1998 | Holm-Kennedy et al. |
| 5,796,007 A | 8/1998 | Panagotopulos et al. |
| 5,818,586 A | 10/1998 | Lehto et al. |
| 5,835,214 A | 11/1998 | Cabib et al. |
| 5,835,645 A | 11/1998 | Jorgenson et al. |
| 5,847,828 A | 12/1998 | Downs |
| 5,852,498 A | 12/1998 | Youvan et al. |
| 5,872,628 A | 2/1999 | Erskine |
| 5,889,590 A | 3/1999 | Duggal et al. |
| 5,891,747 A | 4/1999 | Farah |
| 5,910,840 A | 6/1999 | Furstenau |
| 5,923,030 A | 7/1999 | Assard et al. |
| 5,926,591 A | 7/1999 | Labeye et al. |
| 5,929,990 A | 7/1999 | Hall |
| 5,949,801 A | 9/1999 | Tayebati |
| 5,986,749 A | 11/1999 | Wu et al. |
| 5,999,261 A | 12/1999 | Pressesky et al. |
| 5,999,262 A | 12/1999 | Dobschal et al. |
| 6,016,702 A | 1/2000 | Maron |
| 6,020,963 A | 2/2000 | DiMarzio |
| 6,057,911 A | 5/2000 | Reich |
| 6,064,630 A | 5/2000 | Fersht et al. |
| 6,069,686 A | 5/2000 | Wang et al. |
| 6,075,613 A | 6/2000 | Schermer et al. |
| 6,078,706 A | 6/2000 | Nau et al. |
| 6,088,144 A | 7/2000 | Doerr |
| 6,115,521 A | 9/2000 | Tran et al. |
| 6,118,534 A | 9/2000 | Miller |
| 6,122,415 A | 9/2000 | Blake |
| 6,137,621 A | 10/2000 | Wu |
| 6,151,114 A | 11/2000 | Russell |
| 6,157,025 A | 12/2000 | Katagiri et al. |
| 6,173,091 B1 | 1/2001 | Reich |
| 6,178,001 B1 | 1/2001 | Kim |
| 6,201,289 B1 | 3/2001 | Jou |
| 6,212,306 B1 | 4/2001 | Cooper et al. |
| 6,233,262 B1 | 5/2001 | Mesh et al. |
| 6,281,976 B1 | 8/2001 | Taylor et al. |
| 6,282,215 B1 | 8/2001 | Zorabedian et al. |
| 6,289,143 B1 | 9/2001 | Berthold et al. |
| 6,304,686 B1 | 10/2001 | Yamate et al. |
| 6,328,647 B1 | 12/2001 | Traudt |
| 6,330,255 B1 | 12/2001 | Hung |
| 6,331,892 B1 | 12/2001 | Green |
| 6,396,605 B1 | 5/2002 | Heflinger et al. |
| 6,422,084 B1 | 7/2002 | Fernald et al. |
| 6,425,290 B2 | 7/2002 | Willcox et al. |
| 6,439,055 B1 | 8/2002 | Maron et al. |
| 6,469,817 B1 | 10/2002 | Heflinger |
| 6,486,984 B1 | 11/2002 | Baney et al. |
| 6,490,038 B1 | 12/2002 | Jung et al. |
| 6,492,636 B1 | 12/2002 | Chen et al. |
| 6,492,800 B1 | 12/2002 | Woods et al. |
| 6,496,265 B1 | 12/2002 | Duncan et al. |
| 6,501,551 B1 | 12/2002 | Tearney et al. |
| 6,522,797 B1 | 2/2003 | Siems et al. |
| 6,538,748 B1 | 3/2003 | Tucker et al. |
| 6,539,136 B1 | 3/2003 | Dianov et al. |
| 6,545,760 B1 | 4/2003 | Froggatt et al. |
| 6,552,799 B1 | 4/2003 | Wright et al. |
| 6,563,698 B1 | 5/2003 | Davis et al. |
| 6,583,882 B2 | 6/2003 | Scruggs et al. |
| 6,594,022 B1 | 7/2003 | Watterson et al. |
| 6,597,458 B2 | 7/2003 | Tayag et al. |
| 6,603,560 B1 | 8/2003 | Islam |
| 6,608,685 B2 | 8/2003 | Wood et al. |
| 6,612,174 B2 | 9/2003 | Sittler et al. |
| 6,621,258 B2 | 9/2003 | Davidson et al. |
| 6,633,593 B2 | 10/2003 | Ksendzov et al. |
| 6,636,321 B2 | 10/2003 | Bohnert |
| 6,643,025 B2 | 11/2003 | Degertekin et al. |
| 6,647,160 B1 | 11/2003 | Chi et al. |
| 6,650,420 B2 | 11/2003 | Houston et al. |
| 6,667,935 B2 | 12/2003 | Vakoc |
| 6,668,105 B2 | 12/2003 | Chen et al. |
| 6,668,111 B2 | 12/2003 | Tapalian et al. |
| 6,668,656 B2 | 12/2003 | Fernald et al. |
| 6,680,472 B1 | 1/2004 | Thingbø et al. |
| 6,687,011 B1 | 2/2004 | Lee et al. |
| 6,687,036 B2 | 2/2004 | Riza |
| 6,690,873 B2 | 2/2004 | Bendett et al. |
| 6,714,566 B1 | 3/2004 | Coldren et al. |

| Patent No. | Date | Name |
|---|---|---|
| 6,714,700 B2 | 3/2004 | Burger et al. |
| 6,717,965 B2 | 4/2004 | Hopkins, II et al. |
| 6,735,224 B2 | 5/2004 | Murry et al. |
| 6,741,357 B2 | 5/2004 | Wang et al. |
| 6,747,743 B2 | 6/2004 | Skinner et al. |
| 6,765,194 B2 | 7/2004 | Holz et al. |
| 6,771,905 B1 | 8/2004 | Bortz |
| 6,776,049 B2 | 8/2004 | Johnson et al. |
| 6,785,004 B2 | 8/2004 | Kersey et al. |
| 6,791,694 B2 | 9/2004 | Pezeshki |
| 6,798,940 B2 | 9/2004 | Lee et al. |
| 6,806,961 B2 | 10/2004 | Hill |
| 6,820,489 B2 | 11/2004 | Fernald et al. |
| 6,822,979 B2 | 11/2004 | Daiber |
| 6,825,934 B2 | 11/2004 | Baney et al. |
| 6,829,073 B1 | 12/2004 | Krol et al. |
| 6,838,660 B2 | 1/2005 | Duncan et al. |
| 6,839,131 B2 | 1/2005 | Kwon |
| 6,842,254 B2 | 1/2005 | Van Neste et al. |
| 6,879,421 B2 | 4/2005 | Clark et al. |
| 6,882,428 B2 | 4/2005 | Baney et al. |
| 6,886,365 B2 | 5/2005 | Rumpf et al. |
| 6,886,404 B2 | 5/2005 | Digonnet et al. |
| 6,894,787 B2 | 5/2005 | Youngner et al. |
| 6,898,339 B2 | 5/2005 | Shah et al. |
| 6,900,896 B2 | 5/2005 | Motamedi et al. |
| 6,901,088 B2 | 5/2005 | Li et al. |
| 6,901,176 B2 | 5/2005 | Balachandran et al. |
| 6,904,070 B2 | 6/2005 | Pontis et al. |
| 6,909,548 B2 | 6/2005 | Duggan |
| 6,915,048 B2 | 7/2005 | Kersey et al. |
| 6,917,736 B1 | 7/2005 | Ersoy |
| 6,921,894 B2 | 7/2005 | Swierkowski |
| 6,925,213 B2 | 8/2005 | Boyd et al. |
| 6,940,588 B2 | 9/2005 | Woodside et al. |
| 6,947,218 B2 | 9/2005 | Turner, III |
| 6,955,085 B2 | 10/2005 | Jones et al. |
| 6,963,404 B2 | 11/2005 | Chang |
| 6,985,235 B2 | 1/2006 | Bao et al. |
| 6,989,906 B2 | 1/2006 | Sandercock |
| 7,002,697 B2 | 2/2006 | Domash et al. |
| 7,009,691 B2 | 3/2006 | VanWiggeren et al. |
| 7,016,047 B2 | 3/2006 | May |
| 7,019,837 B2 | 3/2006 | Waagaard |
| 7,043,102 B2 | 5/2006 | Okamoto et al. |
| 7,046,349 B2 | 5/2006 | Everall et al. |
| 7,047,816 B2 | 5/2006 | Jones et al. |
| 7,065,108 B2 | 6/2006 | Park et al. |
| 7,134,346 B2 | 11/2006 | Lopushansky et al. |
| 7,139,081 B2 | 11/2006 | DeGroot |
| 7,139,295 B2 | 11/2006 | Tsai et al. |
| 7,173,713 B2 | 2/2007 | Xu et al. |
| 7,230,959 B2 | 6/2007 | Johnson |
| 7,305,158 B2 | 12/2007 | Jeffers et al. |
| 7,355,684 B2 | 4/2008 | Jeffers et al. |
| 7,355,726 B2 | 4/2008 | Jeffers et al. |
| 7,405,829 B2 | 7/2008 | Shen |
| 7,434,472 B2 | 10/2008 | Leitko et al. |
| 7,492,463 B2 | 2/2009 | Lopushansky et al. |
| 7,511,823 B2 | 3/2009 | Schultz et al. |
| 2001/0013934 A1 | 8/2001 | Varnham |
| 2002/0015155 A1 | 2/2002 | Pechstedt et al. |
| 2002/0041722 A1 | 4/2002 | Johnson et al. |
| 2002/0109081 A1 | 8/2002 | Tarvin et al. |
| 2002/0167730 A1 | 11/2002 | Needham et al. |
| 2002/0186377 A1 | 12/2002 | Kuskovsky et al. |
| 2003/0020926 A1 | 1/2003 | Miron |
| 2003/0025912 A1 | 2/2003 | Hui et al. |
| 2003/0081875 A1 | 5/2003 | Kochergin et al. |
| 2003/0128917 A1 | 7/2003 | Turpin et al. |
| 2003/0132375 A1 | 7/2003 | Blazo |
| 2003/0141440 A1 | 7/2003 | Kim et al. |
| 2003/0159518 A1 | 8/2003 | Sawatari et al. |
| 2003/0184867 A1 | 10/2003 | Clark |
| 2004/0008742 A1 | 1/2004 | Chou et al. |
| 2004/0013040 A1 | 1/2004 | Maas et al. |
| 2004/0013356 A1 | 1/2004 | Wang et al. |
| 2004/0113104 A1 | 6/2004 | Maida, Jr. |
| 2004/0141184 A1 | 7/2004 | Ueki |
| 2004/0151216 A1 | 8/2004 | Tsai et al. |
| 2004/0151438 A1 | 8/2004 | Ferguson |
| 2004/0196874 A1 | 10/2004 | Spiegelberg et al. |
| 2004/0202399 A1 | 10/2004 | Kochergin et al. |
| 2005/0046862 A1 | 3/2005 | Melnyk |
| 2005/0073690 A1 | 4/2005 | Abbink et al. |
| 2005/0105098 A1 | 5/2005 | Johansen et al. |
| 2005/0213870 A1 | 9/2005 | Kersey et al. |
| 2005/0218299 A1 | 10/2005 | Olsen et al. |
| 2005/0231729 A1 | 10/2005 | Lopushansky et al. |
| 2005/0231730 A1 | 10/2005 | Jeffers et al. |
| 2005/0237538 A1 | 10/2005 | Belleville |
| 2005/0242096 A1 | 11/2005 | Jaghab |
| 2006/0034569 A1 | 2/2006 | Shih et al. |
| 2006/0126070 A1* | 6/2006 | Kauppinen ............... 356/432 |
| 2006/0139652 A1 | 6/2006 | Berthold |
| 2006/0146337 A1 | 7/2006 | Hartog |
| 2006/0152733 A1 | 7/2006 | Waagaard |
| 2006/0241889 A1 | 10/2006 | Lopushansky et al. |
| 2006/0274323 A1 | 12/2006 | Gibler et al. |
| 2007/0006663 A1 | 1/2007 | Zerwekh et al. |
| 2007/0064241 A1 | 3/2007 | Needham |
| 2007/0227252 A1 | 10/2007 | Leitko et al. |
| 2007/0252998 A1 | 11/2007 | Berthold et al. |
| 2008/0043245 A1 | 2/2008 | Needham |
| 2008/0174781 A1 | 7/2008 | Berthold et al. |
| 2008/0186506 A1 | 8/2008 | Lopushansky |
| 2008/0297808 A1 | 12/2008 | Riza et al. |
| 2009/0056447 A1 | 3/2009 | Berthold et al. |
| 2009/0086214 A1* | 4/2009 | Chin et al. ............... 356/480 |

FOREIGN PATENT DOCUMENTS

| | | |
|---|---|---|
| DE | 3411096 | 6/1983 |
| EP | 0397388 | 11/1990 |
| EP | 0400939 | 12/1990 |
| EP | 0452993 | 10/1991 |
| EP | 0549166 | 6/1993 |
| EP | 0571107 | 11/1993 |
| EP | 0597345 | 11/1999 |
| EP | 1586854 | 10/2005 |
| GB | 1168971 | 10/1969 |

OTHER PUBLICATIONS

MacDougall, Trevor W. and Sanders, Paul E., "Large Diameter Waveguide Bragg Grating Components and Their Application in Downhill Oil & Gas", Wetherford International, Wallingford, CT.

Wavelength Multiplexing of Micromechanical System Pressure and Temperature Sensors Using Fiber Bragg Gratings and Arrayed Waveguide Gratings, Li et al, Optical Engineering Feb. 2003, p. 431-438.

Optical Fiber Sensor Technology, Grattan and Meggit, 2000, pp. 312-313.

Fiber Optic Sensors, Udd, 1991, p. 147.

"Single Mode Fiber Optics", 1983, Jeunhomme, p. 100.

Electronics Letters, vol. 22, No. 21; Oct. 9, 1986; Stevenage, GB; pp. 1097-1099; M. V. Andres et al., "Optical activation of a silicon vibrating sensor".

IEEE Proceedings D. Control Theory & Applications, vol. 135, No. 5; Sep. 1988; Stevenage, GB; pp. 364-368; M. J. Tudor et al., "Silicon resonator sensors: interrogation techniques and characteristics".

Sensors and Actuators, vol. 20, No. 102; Nov. 15, 1989; Lausanne, CH; pp. 143-151; M. W. Putty et al, "Process integration for active polysilican resonant microstructures".

Sensors and Actuators, A., vol. A21-A23, No. 1-3; Feb. 1990; Lausanne, CH; pp. 387-390; R. M. Pitcher et al., "Optothermal drive of silicon resonators: the influence of surface coatings".

Journal of Vacuum Science and Technology: Part A., vol. 8, No. 4; Jul. 1990; New York, US; pp. 3606-3613; D. W. Burns et al., "Thin films for micromechanical sensors".

Optical Engineering, vol. 31, No. 8; Aug. 1992; Bellingham US; pp. 1638-1642; D. Angelidis et al., "Optical micromachined pressure sensor for aerospace application".

IEEE Micro Electro Mechanical Systems Conference, Feb. 7, 1993, Ft. Lauderdale, FL; pp. 230-235; K. Aratani et al., Process and design considerations for surface icromachined beams for a tuneable.

Proc. Spie, vol. 3762, 1999, R. L. Johnson, et al. "Miniature Instrument for the Measurement of Gap Thickness Using Polychromatic Interferometry".

IEEE Sensors Journal, vol. 3, No. 6, pp. 812-817, Dec. 2003, Tseng et al., "Polymer MEMS-Based Fabry-Perot Shear Stress Sensor".

Proc. Spie, vol. 5589, 2004, MacDougall, Trevor W. and Sanders, Paul E., "Large Diameter Waveguide Bragg Grating Components and Their Application in Downhill Oil & Gas Sensing".

Kersey, Alan D., Fiber Granting Sensors, Journal of Lightwave Technology, vol. 15 No. 8, Aug. 1997.

Clowes, J. R., Effects of High Temperature and Pressure on Silica Optical Fiber Sensors, IEEE Photonics Technology Letters, vol. 10, No. 3, Mar. 1998.

Chan, Chi Chiu, Performance Analysis of a Time-Division-Multiplexed Fiber Bragg Grating Sensor Array by Use of a Tunable Laser Source, IEEE Journal of Selected Topics in Quantum Electronics, vol. 6, No. 5, Sep./Oct. 2000.

Senior, J.M., Multiplexing Techniques for Noninterferometric Optical Point-Sensor Networks: A Review, Fiber and Integrated Optics, 17:3-20, Copyright 1998 Taylor & Francis, 1998.

Kersey, Alan D., Fiber Grating Sensors; Journal of Lightwave Technology, vol. 15, No. 8, © 1997 IEEE, Aug. 1997.

J.R. Clowes, et al., Effects of High Temperature and Pressure on Silica Optical Fiber Sensors; IEEE Photonics Technology Letters, vol. 10, No. 3; © 1998 IEEE, Mar. 1998.

J.M. Senior, Multiplexing Techniques for Noninterferometric Optical Point-Sensor Networks: A Review, Fiber and Integrated Optics, 17:3-20, Copyright 1998 Taylor & Francis, 1998.

Chi Chiu Chan, et al., Performance Analysis of a Time-Division-Multiplexed Fiber Bragg Grating Sensor Array by Use of a Tunable Laser Source, IEEE Journal of Selected Topics in Quantum Electronics, vol. 6, No. 5; © 2000 IEEE, Sep./Oct. 2000.

* cited by examiner

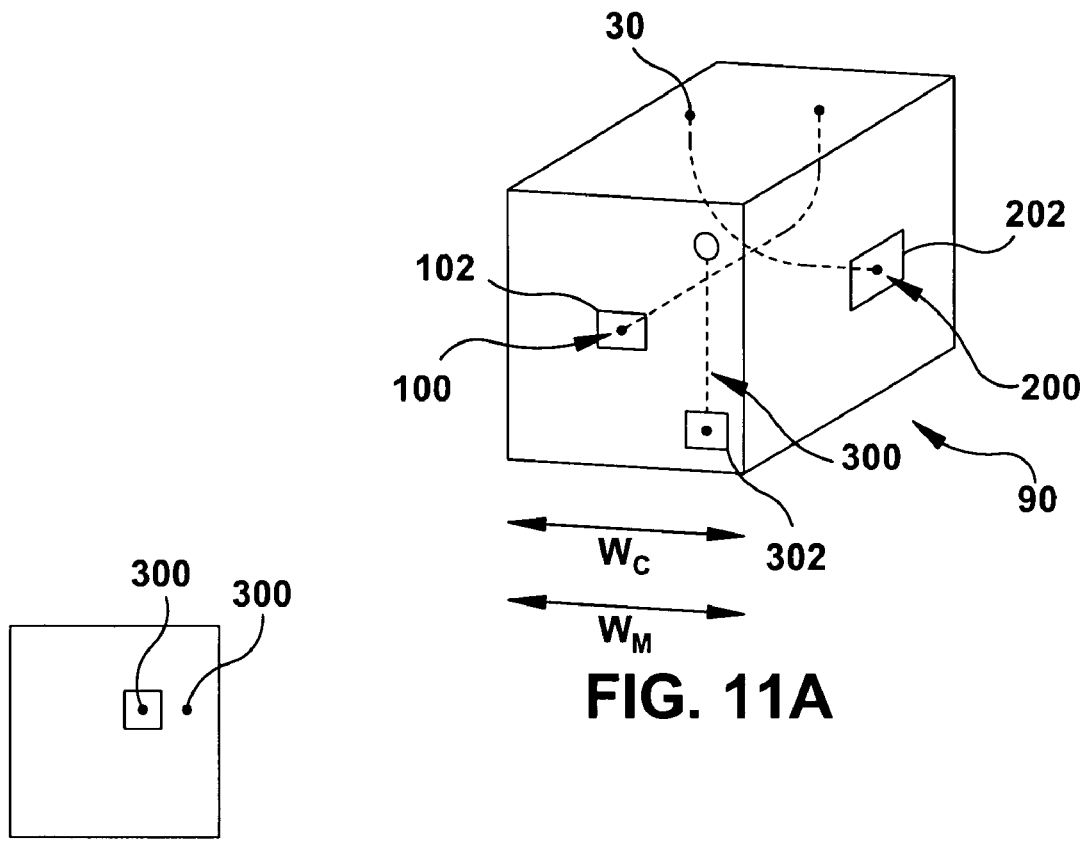
FIG. 11A
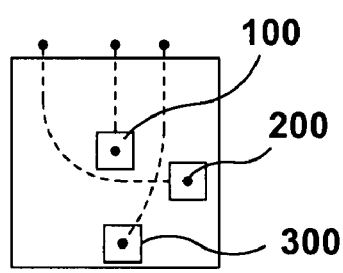
FIG. 11B
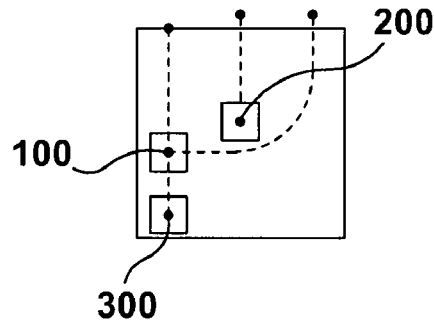
FIG. 11C
FIG. 11D

FIBER OPTIC SEISMIC SENSOR BASED ON MEMS CANTILEVER

CROSS-REFERENCE TO RELATED APPLICATION

This non-provisional patent application claims the benefit of U.S. Provisional Patent Application No. 60/792,878, entitled "FIBER OPTIC SEISMIC SENSOR BASED ON MEMS CANTILEVER," filed Apr. 18, 2006, which is hereby incorporated in its entirety.

FIELD OF THE INVENTION

The present invention relates in general to fiber optic seismic sensors, and more particularly, to an interferometric micro-electro-mechanical system optical sensor to be used for seismic sensing.

BACKGROUND

The traditional method for detecting land seismic signals has been the coil-type geophone. Geophone sensors consist of a mass-spring assembly contained in a cartridge about 3 cm long and weighing about 75 grams. In a typical geophone sensor, the spring is soft and as the cartridge case moves, the mass (coil) is held in place by its own inertia. Thus, the coil serves as a reference for measurement of the cartridge displacement. The geophone sensor arrangement is ideal for measurement of large, oscillatory displacements on the order of millimeters with sub-micrometer resolution. However, the frequency range of these sensors is limited. For best sensitivity to small displacements, a given sensor has a mechanical bandwidth of about 10 Hz. Sensors can be designed with center frequencies from 20 Hz to 100 Hz.

Micro-Electro-Mechanical Systems (MEMS) are miniature mechanical components fabricated in silicon wafers. The fabrication methods are based on the same photolithographic and etching processes used to manufacture electronic circuits in silicon. In fact, most MEMS devices include not only miniature mechanical components such as beams, nozzles, gears, etc., but also integrated electronic components to provide local signal conditioning. Unfortunately, the integrated circuits limit the maximum operating temperature of electronic MEMS to 75° C. The maximum temperature limit can be extended to 400° C. or more if optical fiber sensors are integrated with mechanical MEMS components so that no electronics are needed in the high temperature environment.

Recently, MEMS accelerometer have been developed for 3-component (3C) land seismic measurements. In the MEMS accelerometer, a mass-spring assembly may also be incorporated. However, unlike the geophone, the spring is stiff and the mass moves with the case that houses the MEMS. The inertia of the mass causes strain and deflection of the spring. The deflection or strain can be measured with a sensor to determine the acceleration. High performance 3C MEMS accelerometers with capacitance sensors have been demonstrated.

The measurement range of an accelerometers is specified in units of 'G' where 1 G=9.8 m/s$^2$. Commercial specifications include 120 dBV dynamic range (1 G to 10$^{-6}$ G) and 500 Hz mechanical bandwidth with 24-bit digital resolution equivalent to a noise limited performance of 10$^{-7}$G/(Hz)$^{1/2}$. The accelerometer is fabricated on a silicon chip on the order of 100 mm$^2$. Three single-axis accelerometers (each with an application specific integrated circuit (ASIC) on each chip for signal conditioning) are packaged to measure in three orthogonal directions. The limitation of these accelerometers is an upper limit on the operating temperature of 75° C., which is imposed by the electronic integrated circuits and is not a fundamental limitation of silicon itself.

SUMMARY OF INVENTION

The present invention relates to a fiber optic seismic sensor having a silicon frame. A dual cantilevered beam structure is attached to the frame. An optical fiber extends to a borosilicate glass wafer attached to the frame. Glass wafers, such as borosilicate wafers, may be bonded to the optical fiber with a bonding agent having an index of refraction between the refractive index of the fused silica optical fiber and the refractive index of the glass wafer. In an embodiment, the bonding agent has a refractive index substantially similar to optical cement. Light is reflected into the optical fiber from the beam structure for measuring seismic changes.

DESCRIPTION OF THE DRAWINGS

Operation of the invention may be better understood by reference to the following detailed description taken in connection with the following illustrations, wherein:

FIG. 11A is a perspective view of a cube having a triad seismic sensor assembly mounted on an inside surface of the cube in an embodiment of the present invention;

FIG. 11B is a top view of the cube of FIG. 11A;

FIG. 11C is a side view of the cube of FIG. 11A;

FIG. 11D is a front view of the cube of FIG. 11A; and

DETAILED DESCRIPTION

While the present invention is described with reference to the embodiments described herein, it should be clear that the present invention should not be limited to such embodiments. Therefore, the description of the embodiments herein is illustrative of the present invention and should not limit the scope of the invention as claimed.

Figure 1:
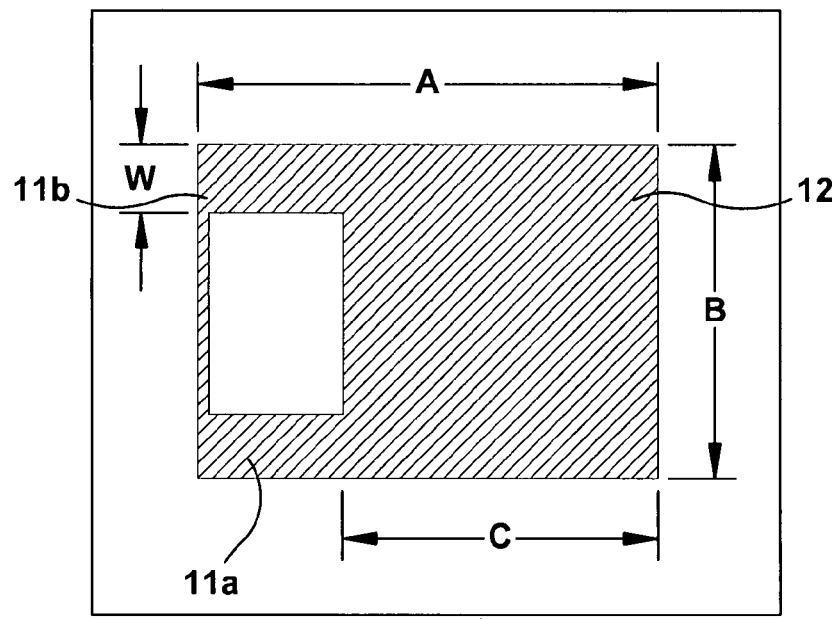
FIG. 1 is a top view of a dual cantilevered mass in an embodiment of the present invention.
Figure 2:
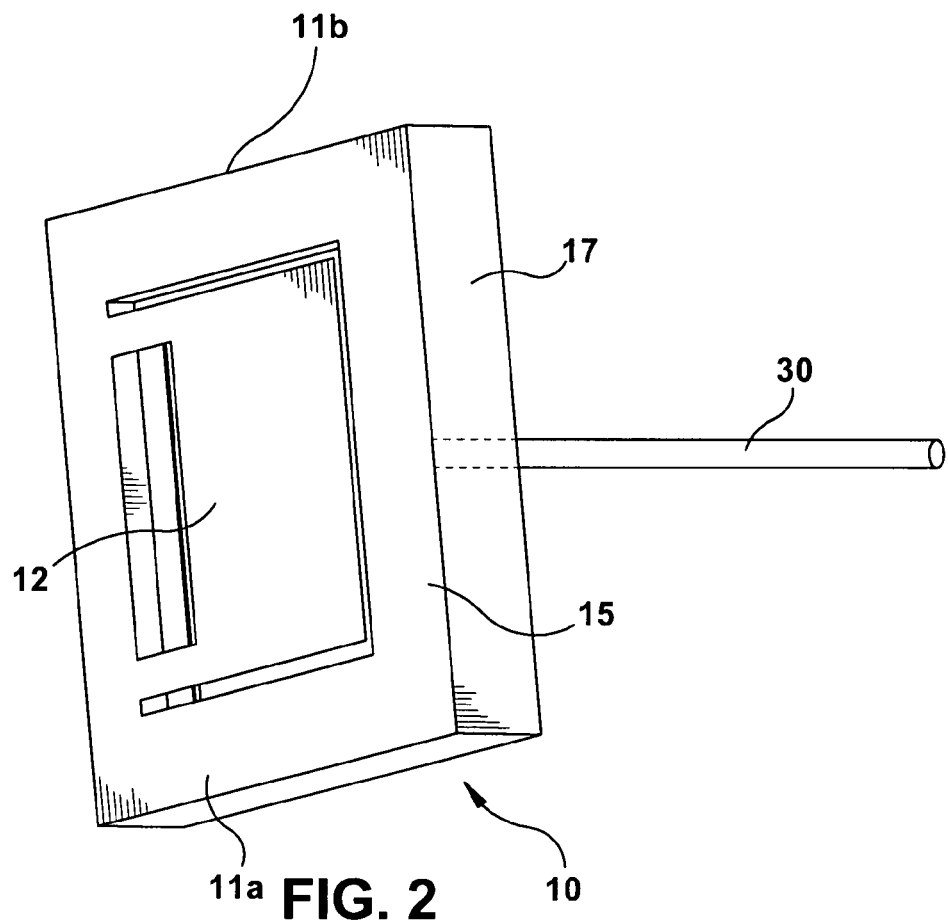
FIG. 2 is a diagram of a seismic sensor assembly in an embodiment of the present invention.

The present invention is a sensor 10, such as, an interferometric MEMS optical sensor that may be used for seismic sensing as generally illustrated in FIG. 2. The sensor 10 may have a cantilevered mass 12 as shown in FIG. 1. The cantilevered mass 12 may have dual beams 11a, 11b, respectively. The structure of the cantilevered mass 12 may provide greater stability and better optical performance than a structure with a single cantilevered beam. The cantilevered mass 12 may have a relatively large-area mass with the beams 11a, 11b supporting the mass area. The beams 11a, 11b are attached or otherwise secured to a silicon frame 15 as illustrated in FIG. 2. In an embodiment, the beams 11a, 11b are secured to the frame 15 at the back edge of the beams 11a, 11b.

FIG. 2 illustrates a perspective view of the sensor 10. In an embodiment, the frame 15 may be a silicon frame for bonding to glass wafers 17. The top glass wafer (lid) is not shown but covers the beam 12. The frame 15 may be bonded on both surfaces to separate the glass wafers 17. In a preferred embodiment, the wafers 17 are borosilicate glass wafers; however, the wafers 17 may be made of other material, such as, other types of glass capable of anodically bonding to a silicon frame 15. In one embodiment, the cantilever mass 12 and the beams 11a, 11b have uniform thickness as shown in FIG. 2. The thickness of the cantilever mass 12 and beams 11a, 11b may be controlled, modified or altered during, for example, etching of the frame 15 using known standard etching methods. The thickness and other dimensions, all of which are controlled by etching are listed in Table 1.

Table 1 illustrates the configuration and predicted performance of the sensor 10.

TABLE 1

Cantilever Configuration and Performance Summary

| Deflection (nm) | Resonance fn (Hz) | A (mm) | B (mm) | C (mm) | W (mm) | Thickness (mm) | Max Stress (Pa) | E* (GPa) |
|---|---|---|---|---|---|---|---|---|
| 1775 | 558 | 3.95 | 4.00 | 3.00 | 0.40 | .025 | 48 × 106 | 190 |

*E is Young's modulus for silicon.

In one embodiment, the frame 15 is a silicon wafer capable of being etched to form or define the beams 11a, 11b and cantilevered mass 12. For example, etching the top surface of the frame 15 may form the cantilevered mass 12 supported by the beams 11a, 11b. A cavity or interferometric sensor gap 18 within the sensor 10 may be formed by etching the bottom surface of the frame 15. In an embodiment, the cavity 18 has a depth of approximately 93.75 microns with a specification tolerance of +/−0.5 μm.

Figure 5:
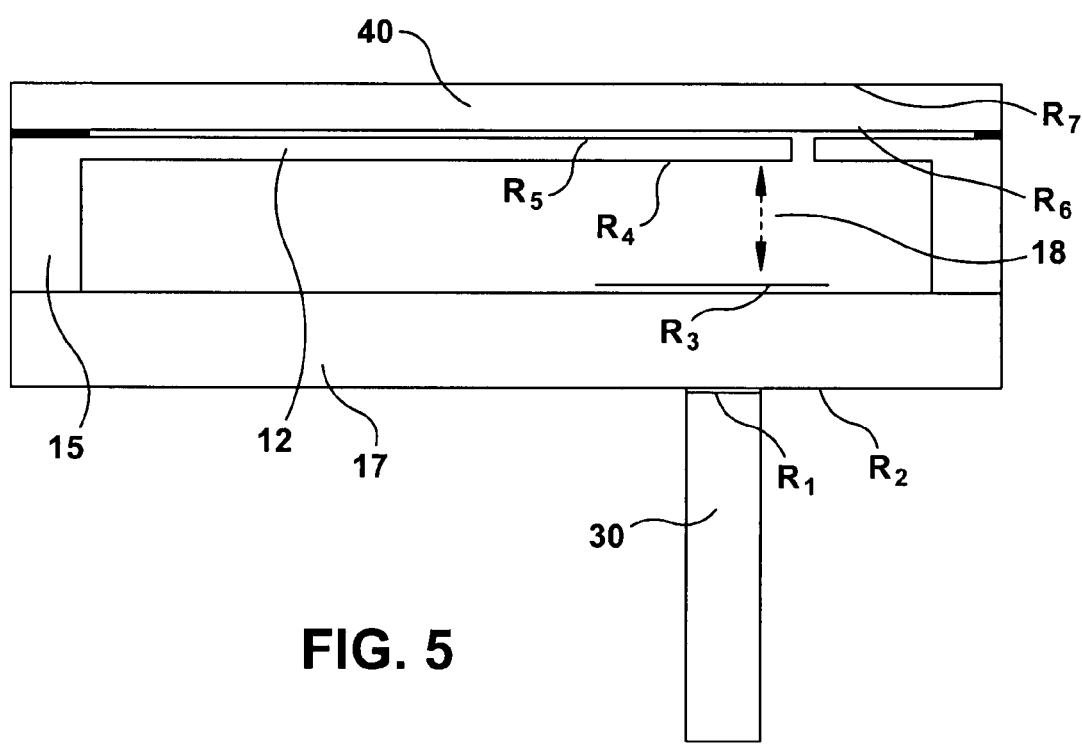
FIG. 5 is a cross-sectional view of a seismic sensor assembly in an embodiment of the present invention.

FIG. 5 illustrates the sensor assembly 10 in an embodiment of the present invention. The frame 15 of the sensor 10 is attached to the beams 11a, 11b. In turn, the beams 11a, 11b are attached to the cantilevered mass 12. In a preferred embodiment, the frame 15 is a silicon wafer etched to form the cantilevered mass 12 and the beams 11a, 11b. The glass wafer 17 that may be a borosilicate substrate, for example, is attached to the frame 15. The cavity (or sensor gap) 18 is defined between the cantilevered mass 12 and the glass wafer 17. An input fiber 30, preferably an optical fiber, is attached to the glass wafer 17 and/or the frame 15.

A lid 40 is attached to the exterior surface of the frame 15. In an embodiment, the lid 40 is borosilicate glass but may be made of other materials as will be appreciated by one of ordinary skill in the art. In a preferred embodiment, the lid 40 is etched or otherwise shaped so that the cantilevered mass 12 is movable to increase the size of the sensor gap. The lid 40 may be positioned such that the cantilevered mass 12 is located between the glass wafer 17 and the lid 40. In such an embodiment, the lid 40 may attach to the frame 15.

The reflective surfaces are $R_1$ through $R_7$. The primary surfaces R3 and R4 define the sensor gap 18, and, in a preferred embodiment, the reflectance of the remaining surfaces must be reduced as close as possible to zero. Each of the reflective surfaces $R_{1-7}$ have a reflectance R. The reflective surface $R_1$ is the end of the input (optical) fiber 30. Reflective surface $R_2$ is the bottom surface of the glass wafer 17, which may be a borosilicate substrate. Reflective surface $R_3$ is the coated interior surface of the glass wafer 17. For illustrative purposes, the reflectance of the reflective surface $R_3$ is equal to 0.4 and may be referenced as $R_3=0.4$. One of ordinary skill in the art will appreciate that the reflectance of the reflective surface $R_3$ may be different and should not be deemed as limited to any specific value.

Reflective surface $R_4$ is the interior surface of the cantilevered mass 12. The reflective surface $R_4$ may be uncoated. In an embodiment, $R_4=0.33$, which is the reflectance of uncoated silicon. Reflective surface $R_5$ is the antireflection (AR) coated outside surface of the cantilevered mass 12. In one embodiment, the reflectance of the reflective surface $R_5$ is less than $5.5\times10^{-4}$ at 1550 nm. The reflective surface $R_6$ is the antireflection coated inner surface of the lid 40. In an embodiment, the reflective surface $R_6$ is less than $4.5\times10^{-4}$ at 1550 nm. Reflective surface $R_7$ is the uncoated outer surface of the lid 40. In such an embodiment, the reflectance of the reflective surface $R_7$ is 0.037 at 1550 nm.

Reflective surfaces $R_3$ and $R_4$ may define the sensor gap 18 as illustrated in FIG. 5. The reflective surface $R_3$ may be located on an interior surface of the glass wafer 17. The reflective surface $R_4$ may be located on the interior surface of the cantilevered mass 12. In at least some embodiment, controlling the depth of the cavity to +/−2 μm may be more feasible for commercial production purposes. The depth of the cavity 18 should not be limited to the embodiments set forth. One of ordinary skill in the art will appreciate that the depth of the cavity and the tolerance of manufacturing the cavity may be altered depending on the application of the sensor 10.

The frame 15 may be bonded to the glass wafer 17. In one embodiment, the frame is a silicon wafer bonded to the glass wafer 17 that may be a borosilicate wafer having partially reflective dielectric coating. In an embodiment, the sensor 10 may be bonded to a borosilicate glass lid to protect and seal the sensor structure. The present invention should not be deemed as limited to glass or borosilicate. One of ordinary skill in the art will appreciate numerous materials within the scope of the present invention, such as, but not limited to materials capable of forming an anodic bond to silicon.

The reflectance at the reflective surface $R_3$ is also referred to as $R_3$. The reflectance of the inner reflective surface $R_4$ from the etched silicon cantilevered mass 12 is defined as $R_4$. The interferometric gap 18 is created by the spacing between $R_3$ and $R_4$ and may become a two-beam interferometer with heterodyne gain.

Table 2 shows the deflection of the cantilevered mass 12 for accelerations of 1 g, 1 milli-g, and 1 micro-g at zero frequency (static) where g=9.8 m/s².

TABLE 2

Cantilever Deflection

| Deflection (nm) | G |
|---|---|
| 1775 | 1.000000 |
| 1.775 | 0.001000 |
| 0.001775 | 0.000001 |

The influence of the Gaussian profile on the insertion loss as the ends of two fibers are displaced (pulled apart) along their common axis is discussed in Jeunhomme, *Single Mode Fiber Optics*, Marcel Dekker, p. 100. The results of the derivations from this reference are presented below. The loss factor $\alpha$ is given by equations 1 and 2.

$$\alpha = \frac{1+4p^2}{(1+2p^2)^2 + p^2} \quad (1)$$

$$p = \frac{d}{kna^2} \quad (2)$$

where:
$k = 2\pi/\lambda$
$\lambda = 1.55\ \mu m$
$d = 2$ (gap)
$a$ = fiber mode radius
$n$ = refractive index of the medium within the gap The above equation assumes that Corning SMF28 single mode fiber is used as the delivery fiber. Although other fibers may be used, information on Corning SMF28 is readily available.

$a = 5.25\ \mu m$

For sensor gap of 93.75 μm, $\alpha = 0.158$ (calculated using Equations 1 and 2).

The insertion loss is determined from equation 3.

$$IL = -10\log(\alpha) \quad (3)$$

Figure 3:
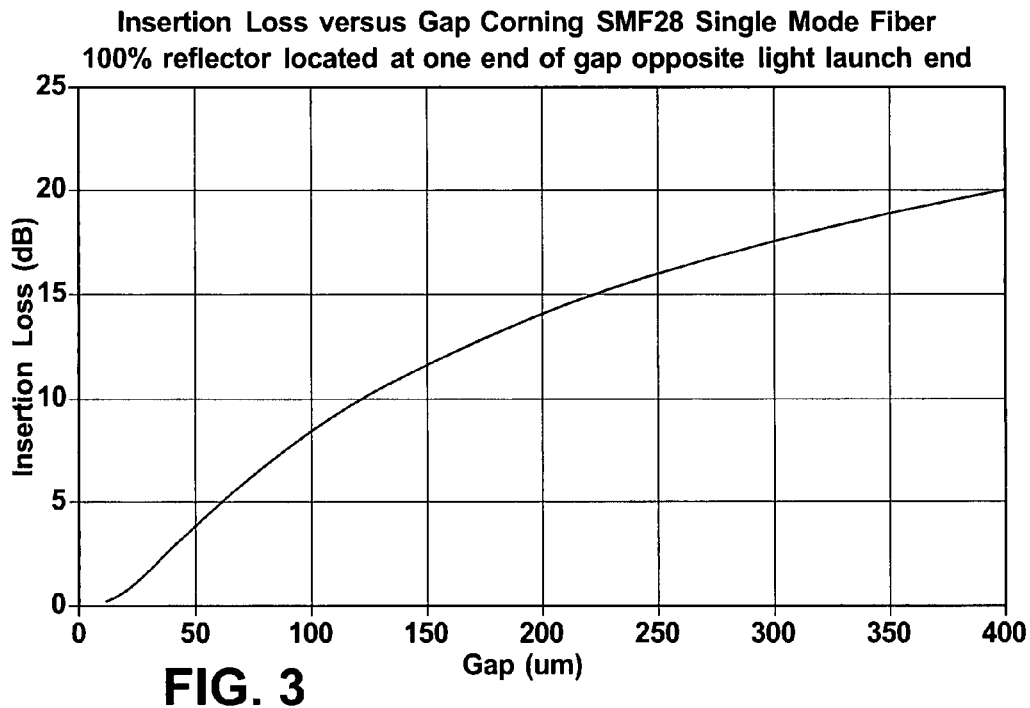
FIG. 3 is a graphical representation of a single mode fiber insertion loss versus gap size in an embodiment of the present invention.

Insertion loss versus the sensor gap is plotted in FIG. 3. The insertion loss is 8 dB for a sensor gap of 93.75 um using Corning SFM28 optical fiber.

Assume for this calculation that the reflector opposite the inner surface of glass wafer 17 is bare silicon. The reflectance R is given by:

$$R = (n_1 - n_2)^2 / (n_1 + n_2)^2 \quad (4)$$

where:
$n_1 = 3.63$ is the refractive index of silicon over the wavelength band 1500-1600 nm
$n_2 = 1.0003$ is the refractive index of air.

Substituting the values into Equation 4, we find $R_{Si} = 0.33$ (33% reflectance).

The plot in FIG. 3 assumes a 100% reflector at the end of the sensor gap 18 and considers the actual distance traversed by the reflected light signal is twice the length of the sensor gap 18.

The input optical fiber 30 directs and/or transmits light into and/or toward the sensor gap 18 and receives light reflected therefrom. The amount of light reflected from the reflective surface $R_4$ that re-enters the input fiber 30 is given by:

$$\alpha R_{Si} = (0.158)(0.33)(1 - R_3) \quad (5)$$

This assumes the configuration as shown in FIG. 2, where the input fiber 30 is bonded to the bottom surface of the glass wafer 17. For example, the input fiber 30 may be bonded to the glass wafer 17 with a substance having a similar index of refraction, such as, optical cement. In an embodiment, the input fiber 30 is bonded to the glass wafer 17 at a location where the glass wafer 17 is 10 μm thick.

If a 40% reflective dielectric coating is placed on the inner surface of the glass wafer 17 that faces the cantilevered mass 12, then $R_3 = 0.4$. Thus, 40% of the light is reflected back to the source and the remaining 60% of the light is transmitted to the cantilevered mass 12. The amount of light reflected into the input fiber 30 from the cantilever mass 12 is:

$$\alpha R_{Si} = R' = (.158)(.33)(1 - 0.4) \quad (6)$$

$$R' = .031$$

Figure 4:
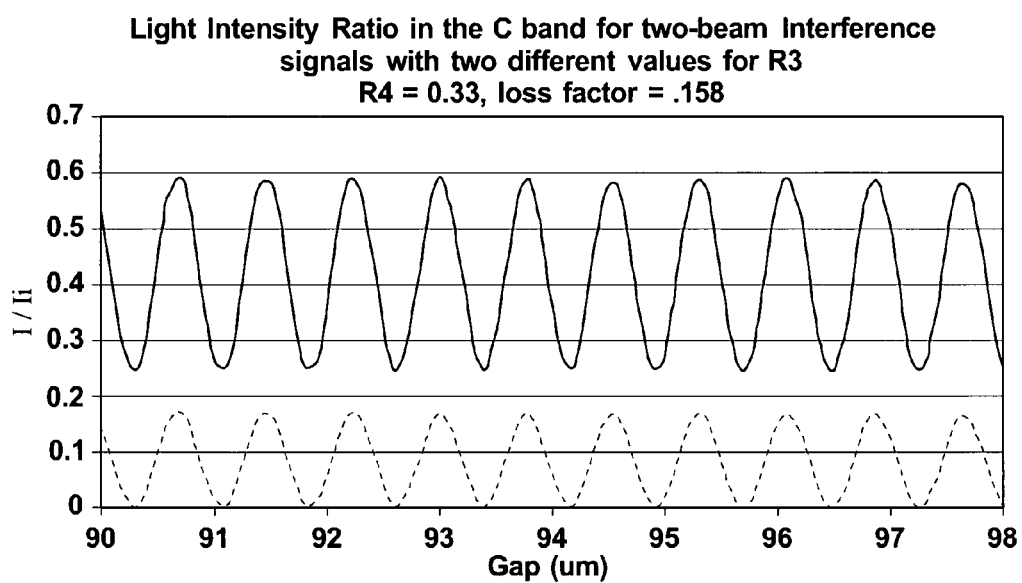
FIG. 4 is a graphical representation of a light intensity versus gap size with λ=1.55 um in an embodiment of the present invention.

Thus, two light signals with unequal intensities reflect back into the input fiber 30. The signal intensities in the input fiber 30 may differ by the factor $R_3/R' = 0.4/0.031 = 12.8$. FIG. 4 shows that if the intensities of the interfering signals are different by a factor of 12.8, the peak to valley difference signal is near optimal and is much greater than when the intensities are equal. This result is fundamentally due to the 40% reflective coating on the glass wafer 17, which reflects a signal that has greater power than the signal, reflected from the cantilevered mass 12. An alternate way to think about this imbalance is to consider the 40% reflected signal as a local oscillator that provides heterodyne gain to the signal reflected from the cantilevered mass 12.

FIG. 4 illustrates and compares the interference between two signals with equal and unequal signal intensities. Each plot is light intensity versus sensor gap 18 for a two-beam interferometer and is a plot of Equation 6 as a function of gap G.

Equation 7 is derived from the layout parameters in FIG. 5. The reflectance at the reflective surface $R_3$ is the 40% reflector and the reflectance at the reflective surface $R_4$ is the 33%. For a two-beam interferometer, the output signal light intensity divided by input intensity $I_o/I_i$ is given by:

$$I/I_i = R_3 + \alpha(1-R_3)^2 R_4 + 2(1-R_3)(\alpha R_3 R_4)^{1/2} \cos(4\pi G/\lambda) \quad (7)$$

where:
$R_3$ = reflectance of dielectric coated glass wafer 17
$R_3 = 0.4$
$R_4$ = reflectance of the cantilevered mass 12
$R_4 = 0.33$
$\alpha$ = loss factor which depends on gap G In the discussion for Equation 6, the intensity of the light signals from $R_3$ and $R_4$ reflected back toward the source may be different. As mentioned above, two interference signals are shown in FIG. 4 for comparison. One interference signal corresponds to the case where $R_3 = 0.037$ and $R_4 = 0.33$, and the light intensities from the $R_3$ and $R_4$ reflected signals have approximately equal intensities inside the input fiber 30. For the unequal intensity case $R_3 = 0.4$ and $R_4 = 0.33$, it is clear that the largest peak to valley difference is obtained with unequal intensities.

Consider Case 1

$R_3 = 0.037\ R_4 = 0.33$ $$P - V = 0.168 \quad (8)$$

Consider Case 2

$$R_3 = 0.4 R_4 = 0.33$$

$$P-V = 0.346 \quad (9)$$

The modulation contrast P–V in Case 2 is more than twice that in Case 1. It is important to note that the "zeroes" in the interference pattern for Case 1 in FIG. 3 may not actually be zero due to electronic noise from the detectors and amplifiers. Assume equivalent electronic noise for Cases 1 and 2. Then Case 2 is preferred as a result of improved modulation contrast and heterodyne gain from the signal reflected from the reflective surface $R_3$.

The analysis below demonstrates how spurious reflections can be limited to $\leq 45$ dB ($3.2 \times 10^{-5}$) below the desired reflected power from the reflected surfaces $R_3$ and $R_4$, respectively. The fundamental problem in maintaining relatively small reflections is locating a bonding agent that can be used between the optical (input) fiber 30 and the glass wafer 17 that may be a borosilicate substrate. For example, locating a bonding agent that has an index of refraction midway between the refractive index of the fused silica optical fiber and borosilicate.

FIG. 5 illustrates a cross-section illustration of the sensor 10. In the embodiments considered below, it is assumed that the reflected-to-incident light intensity ratio is free of any absorbance and that the reflectance R and transmittance T obey the rule (R+T)=1. Refer to the analysis above, Equations 4 and 5. It must be shown that the reflected signals from all surfaces except surfaces 3 and 4 are less than:

$$(R_3 + R')(2.5 \times 10^{-5}) = (0.4 + 0.031)(6.3 \times 10^{-5}) \quad (10)$$
$$= 2.7 \times 10^{-5}$$
$$= -45.7 \text{ dB}$$

where $R_3 = 0.4$ and $R' = 0.031$

Reflective surface $R_1$ may be the bonding agent between the input fiber 30 and the glass wafer 17. For example, the bond between the input fiber 30 and borosilicate substrate glass wafer 17 may be made with an index matching optical cement. The refractive index of the cement may be 1.470 and the refractive index of the input fiber 30 may be 1.455. Using Equation 4, we calculate:

$R_1 = 2.63 \times 10^{-5} = -45.9$ dB Meets the requirement

Consider reference (reflective) surface $R_2$. The refractive index of the cement is 1.470 and the refractive index of the borosilicate substrate is 1.474. Using Equation 4, we calculate:

$R_2 = 0.18 \times 10^{-5} = -57.3$ dB Meets the requirement

Figure 6:
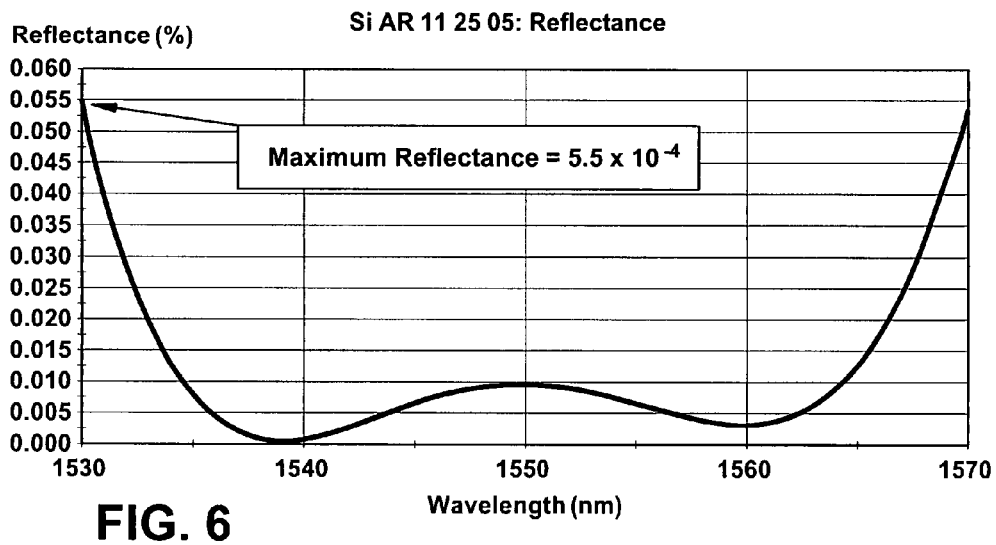
FIG. 6 is a graphical representation of the reflectance from an antireflection coated silicon surface in an embodiment of the present invention.

Consider reference (reflective) surface $R_5$. In an embodiment, the effective sensor gap 18 may be (93.75 μm+($n_{Si}$)(t)), where the refractive index of silicon $n_{Si}$=3.63 and the thickness of the cantilever mass t=25 μm. The maximum reflectivity of the reflective surface $R_5$ is shown in FIG. 6 to be $5.5 \times 10^{-4}$. In such an embodiment, the gap between reference surfaces $R_3$ and $R_5$ is 185 μm and from Equation 1, $\alpha_2$=0.046 excluding the losses from the secondary reflection from all other reference surfaces. The amount of light returning to the input fiber 30 is given by:

$$(1-R_3)(1-R_4)(R_5)(\alpha_2) = (.6)(.67)(5.5 \times 10^{-4})(.046) \quad (11)$$
$$= 1 \times 10^{-5}$$
$$= -49.9 \text{ dB}$$

Meets the requirement

Figure 7:
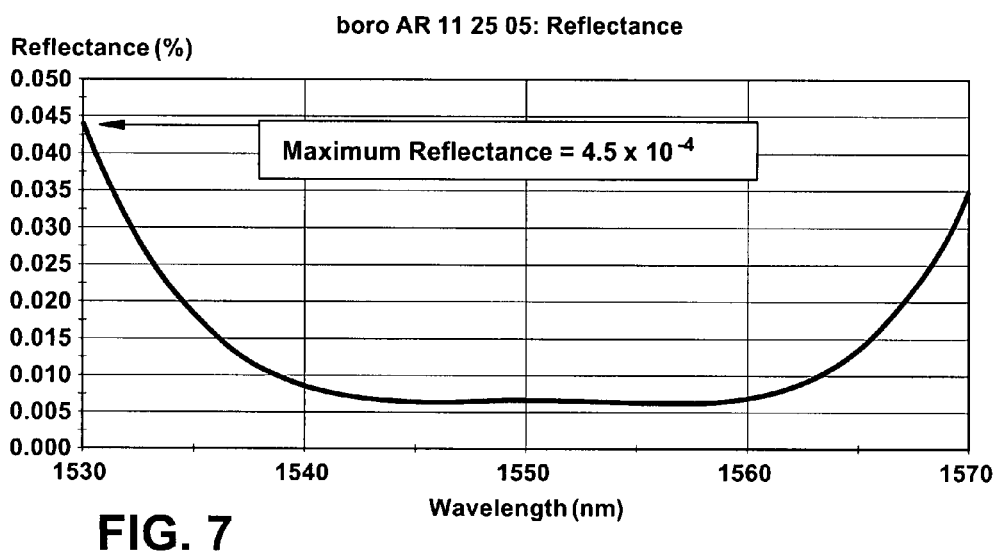
FIG. 7 is a graphical representation of the reflectance from an antireflection coated borosilicate surface in an embodiment of the present invention.

Consider reference (reflective) surface $R_6$. The effective sensor gap 18 is (93.75 μm+($n_{Si}$)(t)+100 μm). As above, the refractive index of silicon $n_{Si}$=3.63, the thickness of the cantilever t=25 μm, and the distance between the outside of the cantilever and the lid is 100 μm. The maximum reflectively of the reflective surface $R_6$ is shown in FIG. 7 to be $4.5 \times 10^{-4}$. The gap between reflective surface $R_3$ and $R_6$ is 285 μm and from Equation 1, $\alpha_3$=0.02 excluding the losses from the secondary reflection from all other reference surfaces. The amount of light returning to the input fiber 30 is given by:

$$(1-R_3)(1-R_4)(1-R_5)(R_6)(\alpha_3) = (.6)(.67)(1)(4.5 \times 10^{-4})(.02) \quad (12)$$
$$= 3.6 \times 10^{-6}$$
$$= -54.4 \text{ dB}$$

Meets the requirement

Consider reference (or reflective) surface $R_7$. In an embodiment, the reflective surface $R_7$ is the exterior surface of a lid 40 for the sensor 10. The lid 40 may be a borosilicate lid and may have a rough-ground surface finish with a non-specular diffuse reflectance. In such an embodiment, the reflectance of the reflective surface $R_7$ may decrease as $1/r^2$, where r is the distance from the surface in microns. The effective reflectance of the reflective surface $R_7$ given in terms of the 3.7% specular reflectance from an uncoated glass surface is:

$$R_7 = 0.037[(1 \text{ μm from surface})/(r)]^2 \quad (13)$$

The effective gap to the outside surface of the borosilicate lid is (93.75 μm+($n_{Si}$)(t)+100 μm+2200 μm). As above, the refractive index of silicon $n_{Si}$=3.63, the thickness of the cantilever t=25 μm, 100 μm is the distance between the outside of the cantilevered mass 12 and the lid 40, and 2.2 mm is the thickness of the lid. The total gap in this case is 2485 μm. Thus the effective reflectance at the end of the fiber is:

$$R_7 = 0.037[(1 \text{ μm from surface})/(2485 \text{ μm})]^2 \quad (14)$$
$$= 6 \times 10^{-9}$$

From Equation 1, $\alpha_4$=0.005. The amount of light returning to the fiber from surface 7 is given by:

$$(1-R_3)(1-R_4)(1-R_5)(1-R_6)(R_7)(\alpha_4) = (.6)(.67)(6 \times 10^{-9})(5 \times 10^{-3}) \quad (15)$$
$$= 1.2 \times 10^{-11}$$
$$= -109 \text{ dB Meets the requirement}$$

The present invention should not be deemed as limited to any specific distances between the lid 40, the reflective surfaces $R_{1-7}$ and/or the frame 15. One of ordinary skill will appreciate that various positions and orientations of the elements of the sensor 10 are possible within the scope of the present invention.

When the MEMS assembly is heated, the gap increases in length by an amount ΔG given by:

$$\Delta G = (CTE)G(\Delta T) \quad (16)$$

Where:
CTE=2.68×10⁻⁶/C is the coefficient of thermal expansion of silicon
G is the gap
ΔT=200° C. is the temperature difference over the operating temperature.

Substituting these values into Equation 16

$$\Delta G = (2.68 \times 10^{-6})(93.75 \ \mu m)(200)$$
$$= .050 \ \mu m$$

Thus, the change in gap with temperature is ten times smaller than the specified tolerance of ±0.5 μm for the gap.

Figure 8:
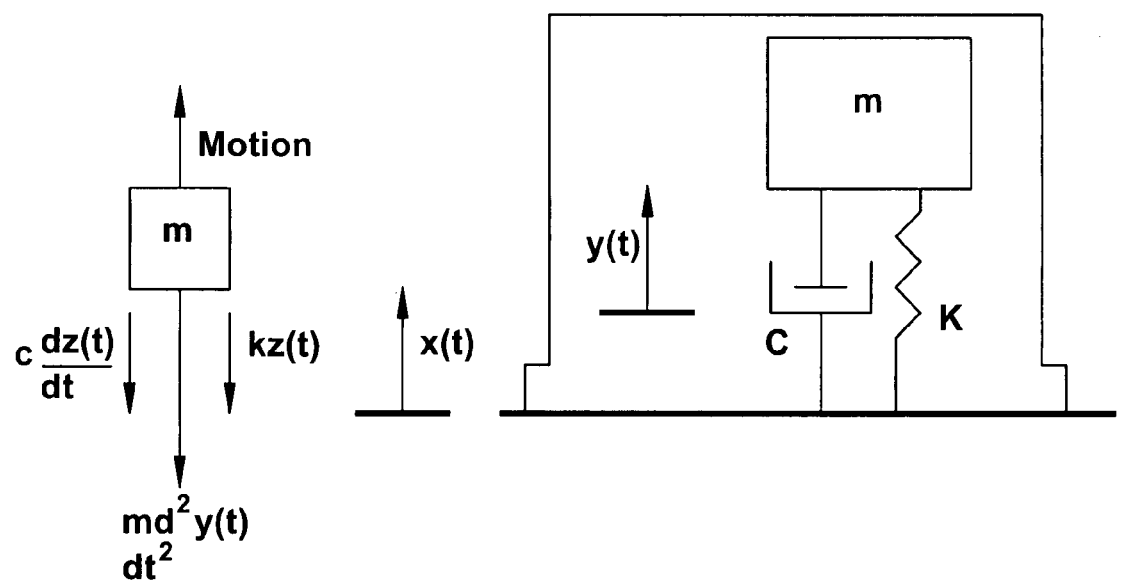
FIG. 8 is a schematical representation of a spring-mass sensor system in an embodiment of the present invention.

The MEMS structure deflects as defined by a spring-mass system with damping as shown in FIG. 8. The container is mounted to a vibrating object and the motion of the object (and the motion of the container) is described by $$x(t) = X \sin(Wt) \quad (17)$$

where:
X is the maximum amplitude of vibration
t is time
W=2πf
f is the vibration frequency The motion of the container is described by x(t), the motion of the mass is described by y(t) and the forces acting on the mass are:
  spring force k z(t)
  damping force c[d z(t)/dt]
  gravitational force m[d2y(t)/dt2]
  where:
  k is the spring constant of the sensor
  c is the damping constant of the sensor
  m is the mass of the sensor
  y(t) represents the amplitude of vibration of the mass and the net motion of the mass relative to the base of the container to which the mass, m is mounted is given by:

$$z(t) = y(t) - x(t) \quad (18)$$

Since the forces are all independent, the following are accurate:

$$z'(t) = y'(t) - x'(t) \quad (19)$$

and $$z''(t) = y''(t) - x''(t) \quad (20)$$

where the prime marks beside the variables indicate first time derivative (single prime) and second time derivative (double prime).

The equation of motion of the mass, m is given by:

$$-kz(t) - cz'(t) - my''(t) = 0 \quad (21)$$

Re-arranging terms in Equation 20 provides:

$$y''(t) = z''(t) + x''(t) \quad (22)$$

Calculating the second derivative of x(t) (Equation 17) and substituting the result into Equation 22 we obtain:

$$y''(t) = z''(t) - XW^2 \sin(Wt) \quad (23)$$

Substituting the second derivative of y(t) (Equation 23) into Equation 21 results in:

$$mz''(t) + cz'(t) + kz(t) = mXW^2 \sin(Wt) \quad (24)$$

The steady-state solution to this differential equation is given by:

$$z(t) = Z \sin(Wt - \Phi) \quad (25)$$

where Z is:

$$Z = \frac{W^2 X}{W_n^2 [(1 - (W/W_n)^2)^2 + (2hW/W_n)^2]^{1/2}} \quad (26)$$

$$\Phi = \tan^{-1}\left[\frac{2h(W/W_n)}{1 - (W/W_n)^2}\right] \quad (27)$$

where:

$$W_n = (k/m)^{1/2} \quad (28)$$

and $$h = \frac{c}{2mW_n} \quad (29)$$

From the MEMS model and Equation 29, the resonant frequency for the cantilever design shown in FIG. 1 can be calculated:

$$f_n = W_n/2\pi$$

$$f_n = 558 \ Hz \quad (30)$$

Figure 9:
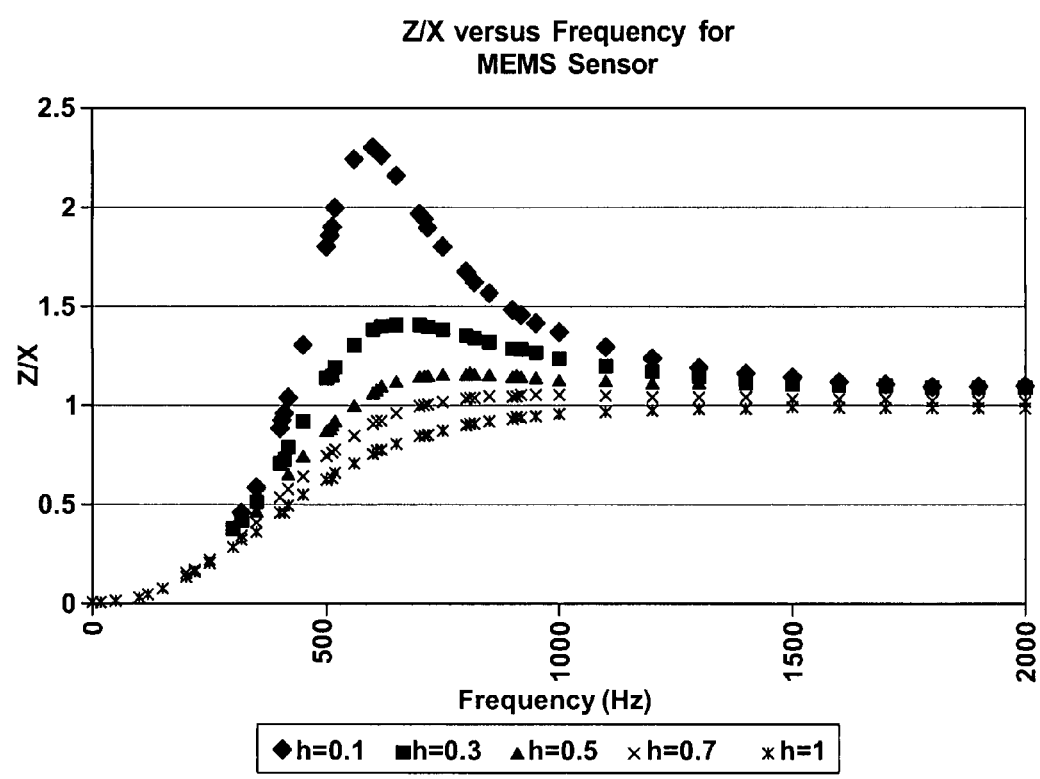
FIG. 9 is a graphical representation of a frequency response of a MEMS sensor for different damping values in an embodiment of the present invention.

The calculated frequency response for Equation 26 for several different values of damping is shown in FIG. 9.

At frequencies below resonance, the spring-mass system behaves as an accelerometer. In this case, W<<$W_n$ and Equation 26 reduces to:

$$Z = a/W_n^2 \quad (31)$$

Where:
  a=$XW^2$ is the acceleration of the object to which the container is mounted (See FIG. 8).

Above the resonant frequency, W>$W_n$ and the displacement amplitude Z approaches the displacement X of the container. To maintain predictable and single-valued response through the resonance, damping is needed.

The internal air pressure in the MEMS sensor assembly 10 shown in FIG. 2 is expected to be approximately 0.4 atmosphere. The internal air resists the motion of the cantilevered mass 12 to provide damping. The expected value of h is between 0.3 and 1, dependent on the internal air pressure. A value of h=0.7 would be preferred.

The change in modulus of silicon with temperature is ≈2×10⁻⁴/C. Over the temperature range 0 to 200° C. the modulus decreases about 4%. This means that at 200° C. the cantilever deflects 4% more than at 0° C.

The maximum deflection in Table 2 is 1.775 µm at ambient temperature, i.e., 22° C. The deflection at 200° C. is approximately (1.775 µm) [1+(2×10$^4$) (200−22)]=1.84 µm. The allowed tolerance on scale factor change is 5% and the calculated scale factor change is well within the allowed tolerance. A secondary source of thermal sensitivity is the change in damping coefficient, h with temperature.

The major uncertainty in sensor scale factor results from tolerance stack-up that influences the thickness of the cantilever mass 12 shown in FIG. 1. It is estimated that a worst-case uncertainty in thickness is of ±24%, which results in scale factor uncertainty of ±45%. The scale factor uncertainty is about ten times more than the allowed tolerance and is a result of tolerance stack-ups and the method used to control the depth of the cavity 18.

Related to uncertainty in thickness of the cantilevered mass 12 is the uncertainty in length of the sensor gap 18. Together, the uncertainty in these parameters will affect yield.

MEMS packaging for this application is important for success. Several embodiments for packaging are contemplated. However, one of ordinary skill in the art will appreciate that other packaging can be used for the present invention. In a first embodiment, the packaging is a single unit package. Referring to FIG. 2, the CTE (coefficient of thermal expansion) of silicon and borosilicate are substantially similar so that the two materials can be bonded and hermetically sealed. If the sensor 10 is packaged in a metal housing and the lid 40 is borosilicate, the borosilicate lid 40 may be bonded to a metal base plate. In an embodiment, the packaging is a triaxial package. The important issues with a triaxial package are the perpendicularity of the three orthogonal axes and the fiber bend radius. The objective is to hold the assembly in a cylindrical containment tube with as small a diameter as possible. The sensor containment tube must be pressure sealed against the high-pressure environment where the unit must operate. The container must include a pressure feed-through for the fiber optic leads. It is known in the art that optical fibers are stiff, straight rods and cannot be bent into a permanent set like flexible electrical wires. When an optical fiber is turned through a small radius bend and released, it springs back to straightness.

Figure 10:
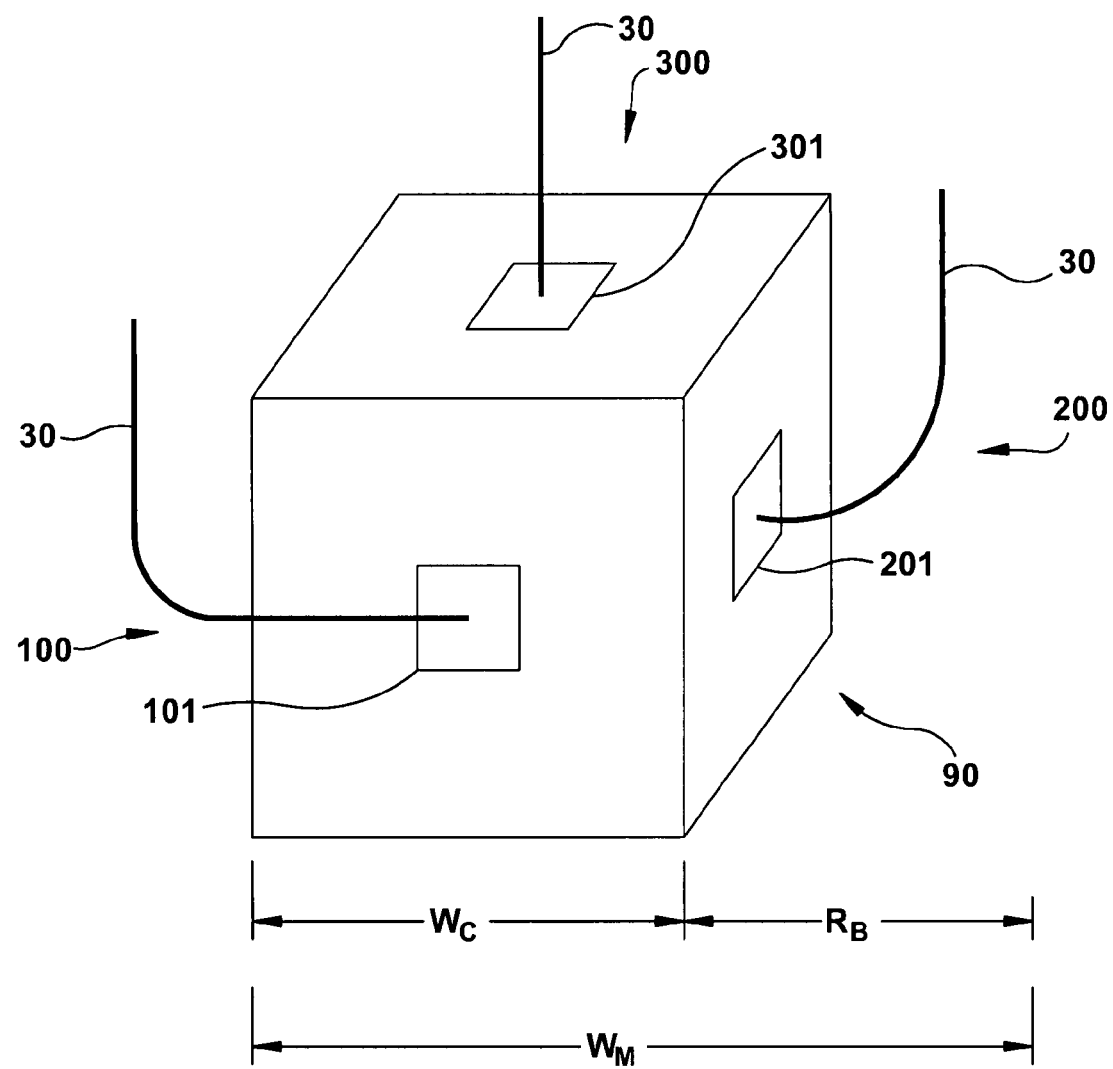
FIG. 10 illustrates a cube connected to a triad of seismic sensors along distinct orthogonal axes in an embodiment of the present invention.

With reference to FIG. 10, sensors 100, 200 and 300 are mounted on the faces of a cube 90 at locations numbered 101, 201, and 301. In an embodiment, all of the optical fibers 30 are required to be routed parallel to one another, which in this example is parallel to the input fiber 30 from sensor 300. The routing requires that each of the input (optical) fibers 30 from the sensors 100 and 200 be turned through a 90° angle. The optical fibers 30 from two of the sensors must negotiate 90° bends so that all three of the optical fibers 30 exit the cylindrical containment tube parallel to the axis of the containment tube.

Three optional approaches are shown in FIGS. 10, 11A-D, and 12. The first approach shown in FIG. 10 is to use a precision cube and to bond the three seismic sensors 100, 200 and 300, respectively, to the three perpendicular sides of the cube 90. The problem with this approach is that the minimum width $W_M$ is equal to the width of the cube $W_C$ plus the bend radius $R_B$ of the optical fiber 30. In this configuration, the fibers 30 from the sensors 100 and 200 may be forced to bend 90° through a very small radius that could place excessive stress on the fibers 30 and limit the life of the respective fibers 30.

Another approach is generally illustrated in FIGS. 11A-11D. The sensors 100, 200 and 300 are mounted on the inside surface of the faces of the cube 90 at locations numbered 102, 202, and 302. In an embodiment, the optical fibers 30 from the sensors 100, 200 may turn through a 90° angle within the interior of the cube 90 and exit the cube 90 parallel to the optical fiber 30 from sensor 300. In one embodiment, the cube 90 may be hollow. The minimum width $W_M$ is equal to width of the cube $W_C$. The bend radius $R_B$ of the input fiber 30 is equal to the width of the cube 90. In this embodiment, the bend radius $R_B$ of the input fibers 30 from the sensors 100 and 200 is larger than the embodiment illustrated in FIG. 10. Therefore, the stress on the input fibers 30 in the embodiment of FIGS. 11A-11D may be less severe than the embodiment illustrated in FIG. 10.

Figure 12:
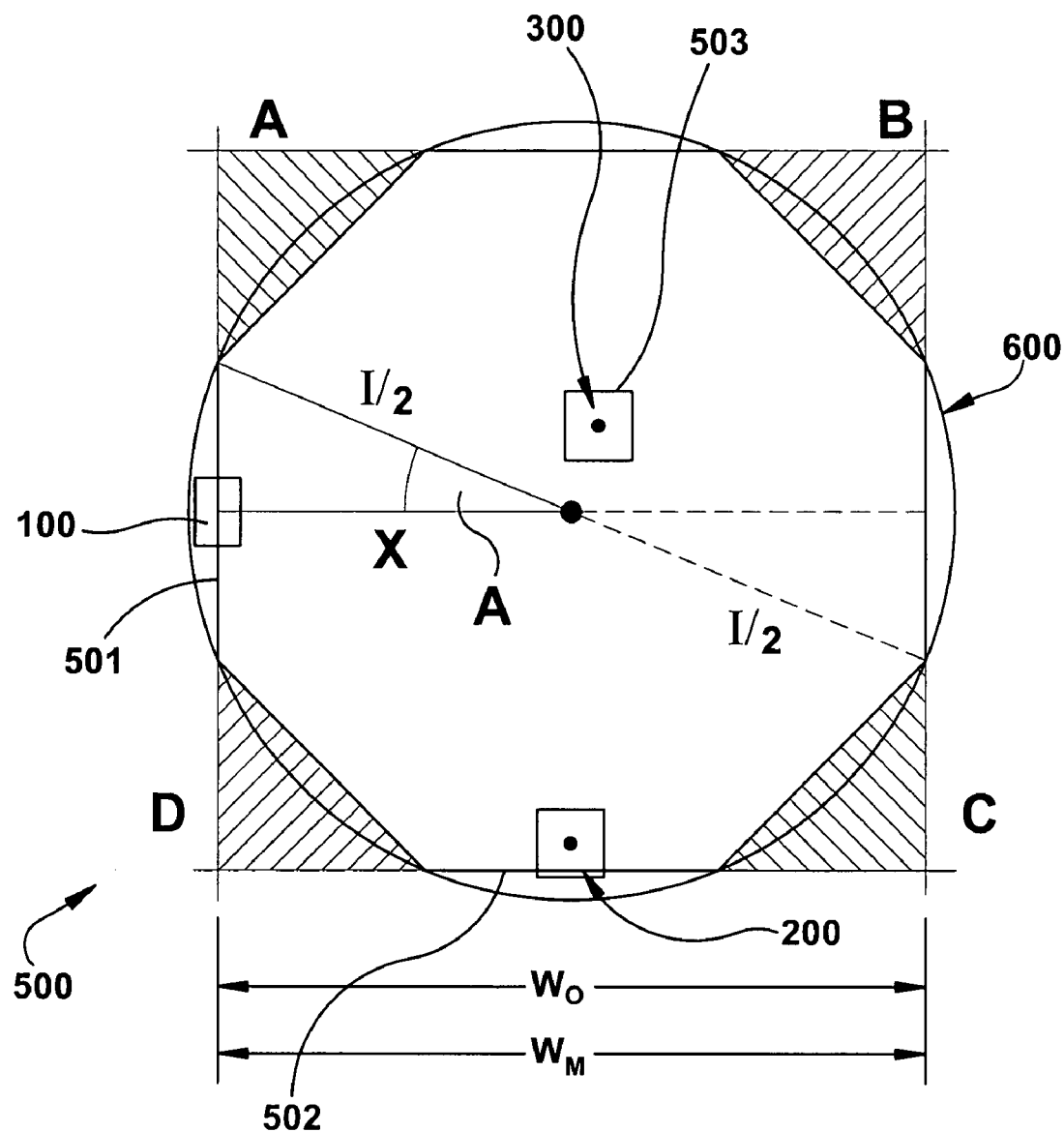
FIG. 12 is an illustration of an octagon structure having a triad seismic sensor assembly connected thereto.
Figure 1:
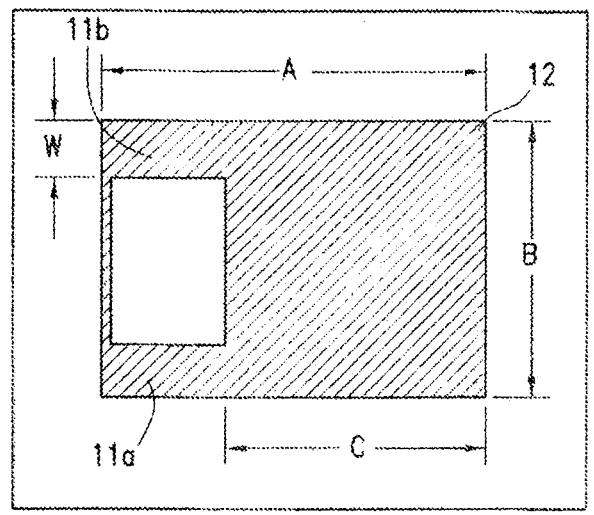
Figure 2:
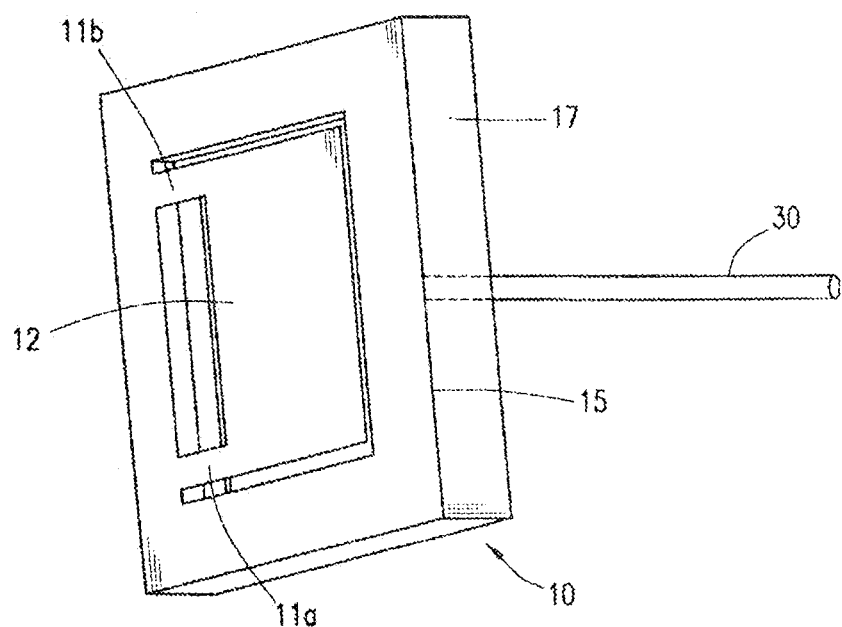

Another embodiment of the invention is generally illustrated in FIG. 12 using a polygon, an octagon 500 in this example. In one embodiment, the octagon 500 may be formed by machining away the corners (A, B, C, D) of the cube 90 and attaching sections of flat material to cover the open space and produce a rigid structure. In a preferred embodiment, each of the faces are approximately equal in length. The sensors 100, 200, 300 are bonded to the inside surfaces 501, 502, 503 of the octagon 500. The triad of the sensors 100, 200 and 300 may be used for measurements in three orthogonal axes, such as, x, y and z. In an embodiment, the optical fibers 30 of the sensors 100 and 200 turn through a 90° angle within the interior of the octagon and exit the octagon 500 parallel to the fiber 30 from sensor 300.

In such an embodiment, the minimum width $W_M$ is the width of the octagon $W_O$ as illustrated in FIG. 12. The advantage of such an embodiment is that the octagon 500 is a better fit within the circumscribed ID of a containment tube 600. The width of the octagon $W_O$ is greater than the width of the cube $W_C$. The optical fibers 30 from the sensors 100 and 200 negotiate the 90° bend within the hollow volume of the octagon 500 with the largest radius and least amount of stress of the embodiments illustrated in FIGS. 10-12.

The exact configuration of the container and pressure feed-through depends on the fiber cable specification. For example, if the input fiber 30 is contained inside a sealed metal sleeve, it is straightforward to seal the outside of the sleeve to the sensor container. The present invention, therefore, provides a relatively small size, high shock resistance, low-cost MEMS assembly.

The invention has been described above and, obviously, modifications and alternations will occur to others upon a reading and understanding of this specification. The claims as follows are intended to include all modifications and alterations insofar as they come within the scope of the claims or the equivalent thereof.

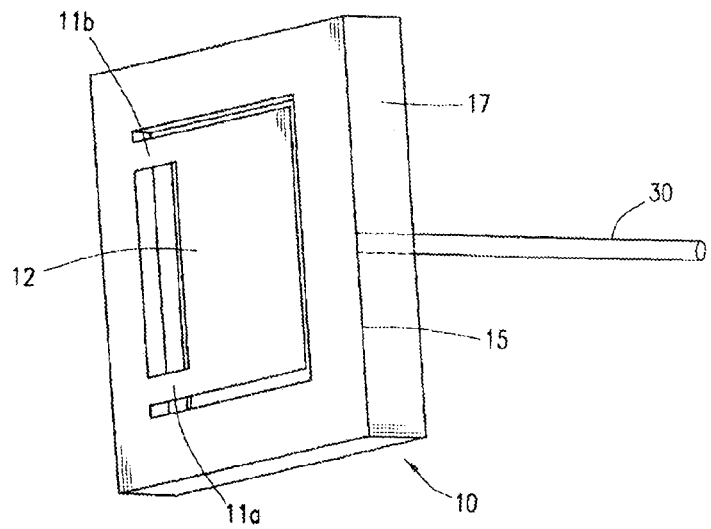

Having thus described the invention, we claim:

1. An apparatus for measuring seismic movement comprising:
   a sensor having:
      a wafer;
      a frame attached to said wafer;
      a cantilevered mass pivotally connected to the frame, the cantilevered mass having two beams, on the same side of the cantilevered mass, for pivoting the cantilevered mass relative to the frame; and
      a cavity located between the cantilevered mass and the wafer wherein the cantilevered mass is capable of moving to change the size of the cavity.

2. The apparatus of claim 1 further comprising:
   a borosilicate lid attached to the beams, wherein said lid is attached to the beams such that the cantilevered mass is movable toward the lid.

3. The apparatus of claim 1 wherein the cantilevered mass is a solid body and further wherein the beams are integrally formed with the solid body.

4. The sensor of claim 1 wherein the beams are capable of moving with respect to the frame.

5. The sensor of claim 1 wherein the frame is a portion of an etched silicon wafer.

6. The sensor of claim 1 wherein the cantilever mass and the beams each have a uniform thickness.

7. The sensor or claim 1 where the wafer is borosilicate glass.

8. The apparatus of claim 1 further comprising:
a borosilicate wafer bonded to the frame, the borosilicate wafer having a partially reflective dielectric coating.

9. The apparatus of claim 8 further comprising:
an optical fiber bonded to the borosilicate wafer, the optical fiber capable of directing light toward the cavity and receiving light reflected from the cavity.

10. The sensor of claim 8 wherein the sensor measures light reflected from the cantilevered mass through the optical fiber to determine seismic movement and further wherein the cantilevered mass moves to change the light reflected from the cantilever mass.

11. The apparatus of claim 9 wherein the optical fiber and the borosilicate wafer are bonded with a bonding agent having an index of refraction midway between the refractive index of the optical fiber and the borosilicate wafer.

12. The sensor of claim 11 wherein the bonding agent is optical cement.

13. An apparatus for measuring seismic movement comprising:
a MEMS sensor having:
a frame;
a borosilicate wafer connected to said frame;
a cantilevered mass pivotally connected to said frame, said cantilevered mass movable with respect to said borosilicate wafer;
a pair of beams attached to the frame and supporting said cantilevered mass, wherein the beams are on the same side of the cantilevered mass; and
an optical fiber attached to the borosilicate wafer for directing light through said borosilicate wafer to said cantilevered mass and receiving light reflected from said cantilevered mass.

14. The apparatus of claim 13 further comprising:
a bonding agent adhering the optical fiber to the borosilicate wafer, the bonding agent having an index of refraction between the refractive index of the optical fiber and the refractive index of the borosilicate wafer.

15. The apparatus of claim 13 further comprising:
a packaging container enclosing the sensor, the container securing the sensor along a first axis.

16. The apparatus of claim 15 further comprising:
a plurality of sensors secured within the container, at least one sensor having a cantilevered mass and a pair of beams supporting said cantilevered mass wherein the cantilevered mass is movable to determine seismic movement.

17. The apparatus of claim 15 wherein the container secures a triad of sensors to measure seismic movement along three different axes.

18. The apparatus of claim 15 wherein the container is an octagonal structure.

19. The apparatus of claim 15 wherein the container is a hollow cube.

20. The apparatus of claim 15 wherein the width of the container is substantially equal to a width of one of the sensors.

* * * * *

UNITED STATES PATENT AND TRADEMARK OFFICE
CERTIFICATE OF CORRECTION

Page 1 of 3

PATENT NO. : 7,684,051 B2
APPLICATION NO. : 11/787965
DATED : March 23, 2010
INVENTOR(S) : John W. Berthold et al.

It is certified that error appears in the above-identified patent and that said Letters Patent is hereby corrected as shown below:

Title Page, illustrative fig. 2 should be deleted and substitute therefor the attached title page consisting of illustrative fig. 2.

<u>In the Drawings</u>

Fig. 2 should be deleted and substitute therefor the attached fig. 2 as shown on page 3, sheet 1 of 9, of the attached pages.

Sheet 1, Fig. 2, the reference numeral 11a the lead line should be attached to the beam. (See attached Replacement Drawing)

Sheet 1, Fig. 2, the reference numeral 11b the lead line should be attached to the beam. (See attached Replacement Drawing)

In the Specification

Column 3, line 17, the word beam should read mass.

Column 12, lines 62 and 63, each reference to the word beams should read frame.

Signed and Sealed this
Tenth Day of December, 2013

Margaret A. Focarino
*Commissioner for Patents of the United States Patent and Trademark Office*

(12) United States Patent
Berthold et al.

(10) Patent No.: US 7,684,051 B2
(45) Date of Patent: Mar. 23, 2010

(54) FIBER OPTIC SEISMIC SENSOR BASED ON MEMS CANTILEVER

(75) Inventors: John W. Berthold, Salem, OH (US); David B. Needham, Magnolia, TX (US)

(73) Assignee: Halliburton Energy Services, Inc., Houston, TX (US)

(*) Notice: Subject to any disclaimer, the term of this patent is extended or adjusted under 35 U.S.C. 154(b) by 391 days.

(21) Appl. No.: 11/787,965

(22) Filed: Apr. 18, 2007

(65) Prior Publication Data
US 2008/0174781 A1 Jul. 24, 2008

Related U.S. Application Data

(60) Provisional application No. 60/792,878, filed on Apr. 18, 2006.

(51) Int. Cl.
*G01B 9/02* (2006.01)

(52) U.S. Cl. .................................................. 356/519

(58) Field of Classification Search ............. 356/480, 356/498, 501, 505, 506, 519
See application file for complete search history.

(56) References Cited

U.S. PATENT DOCUMENTS

| | | | |
|---|---|---|---|
| 1,432,149 A | 10/1922 | Bellingham | |
| 3,923,400 A | 12/1975 | Hardy | |
| 4,210,029 A | 7/1980 | Porter | |
| 4,329,058 A | 5/1982 | James et al. | |
| 4,393,714 A | 7/1983 | Schmidt | |
| 4,418,981 A | 12/1983 | Stowe | |
| 4,428,239 A | 1/1984 | Johnston | |
| 4,572,669 A | 2/1986 | James et al. | |
| 4,576,479 A | 3/1986 | Downs | |
| 4,583,228 A | 4/1986 | Brown et al. | |
| 4,596,466 A | 6/1986 | Ulrich | |
| 4,606,638 A | 8/1986 | Sommargren | |
| 4,628,211 A | 12/1986 | Ruppert | |
| 4,640,616 A | 2/1987 | Michalik | |

(Continued)

FOREIGN PATENT DOCUMENTS

DE    3127333    1/1983

(Continued)

OTHER PUBLICATIONS

R. L. Johnson, et al. "Miniature Instrument for the Measurement of Gap Thickness Using Plychromatic Interferometry", Center for Astronomical Adaptive Optics, Steward Obser., U of AZ, Tucson.

(Continued)

*Primary Examiner*—Tarifur Chowdhury
*Assistant Examiner*—Jonathon D Cook
(74) *Attorney, Agent, or Firm*—Peter Schroeder

(57) ABSTRACT

A dual cantilevered beam structure is attached to a silicon frame. An optical fiber extends from a borosilicate wafer bonded to the bottom of the frame. A second borosilicate wafer is bonded to the top of the frame. The bottom borosilicate wafer is bonded to the optical fiber with a bonding agent having an index of refraction between the refractive index of the fused silica optical fiber and the refractive index of the borosilicate wafer. In an embodiment, the bonding agent has a refractive index substantially similar to optical cement. Light is reflected into the optical fiber from the beam structure for measuring seismic changes.

20 Claims, 9 Drawing Sheets